US008587659B1

(12) United States Patent
Socolinsky et al.

(10) Patent No.: US 8,587,659 B1
(45) Date of Patent: Nov. 19, 2013

(54) METHOD AND APPARATUS FOR DYNAMIC IMAGE REGISTRATION

(75) Inventors: Diego A. Socolinsky, Baltimore, MD (US); Joshua Neuheisel, Baltimore, MD (US); Lawrence B. Wolff, New York, NY (US)

(73) Assignee: Equinox Corporation, New York, NY (US)

( * ) Notice: Subject to any disclaimer, the term of this patent is extended or adjusted under 35 U.S.C. 154(b) by 1419 days.

(21) Appl. No.: 12/116,843

(22) Filed: May 7, 2008

Related U.S. Application Data

(60) Provisional application No. 60/924,264, filed on May 7, 2007.

(51) Int. Cl.
*H04N 7/18* (2006.01)
(52) U.S. Cl.
USPC ............... 348/158; 318/47; 318/68; 318/208; 318/222; 318/333
(58) Field of Classification Search
USPC ................. 348/185, 47, 68, 208, 222, 333
See application file for complete search history.

(56) References Cited

U.S. PATENT DOCUMENTS

| 6,292,593 | B1 * | 9/2001 | Nako et al. ..................... 382/284 |
| 7,620,265 | B1 | 11/2009 | Wolff et al. |
| 7,787,012 | B2 | 8/2010 | Scales et al. |
| 2008/0048931 | A1 * | 2/2008 | Ben-Ari ............................ 345/8 |
| 2010/0218140 | A1 * | 8/2010 | Feke et al. ..................... 715/810 |
| 2010/0254572 | A1 * | 10/2010 | Tener et al. .................... 382/103 |

OTHER PUBLICATIONS

Diego A. Socolinsky, Aswin Krishnamoorthy, Lawrence B. Wolff, Brain Imaging Registration by Correlation of First-Order Geometry, Proc. SPIE. 3661, Medical Imaging 1999: Image Processing 860 (May 21, 1999).

* cited by examiner

*Primary Examiner* — Lan-Dai T Truong
(74) *Attorney, Agent, or Firm* — William A Blake

(57) ABSTRACT

A methodology and apparatus is described that registers images outputted by at least two video camera sensors that are not necessarily bore-sighted nor co-located together. Preferably this can be performed in real-time at least at video rate. The two video camera sensors can be either of similar or two different modalities (e.g., one can be intensified visible, while the other can be thermal infrared) each possibly with a different field-of-view. The methodology and apparatus take advantage of a combination of Inertial Measurement Units (IMUs) information and image registration between the two camera sensors from computational image processing. In one preferred embodiment, the system uses a rifle mounted weapon sight camera sensor and a helmet mounted sensor camera. The aim point of the weapon sight camera sensor (e.g., typically at the image center) zeroed to the true rifle aim point is digitally overlayed as a reticle on the video image from the helmet sensor, displayed on a head mounted display (HMD). In another embodiment pixel-level image fusion is displayed across the overlapping field-of-view of the rifle mounted camera sensor weapon sight with the helmet mounted camera image.

37 Claims, 7 Drawing Sheets

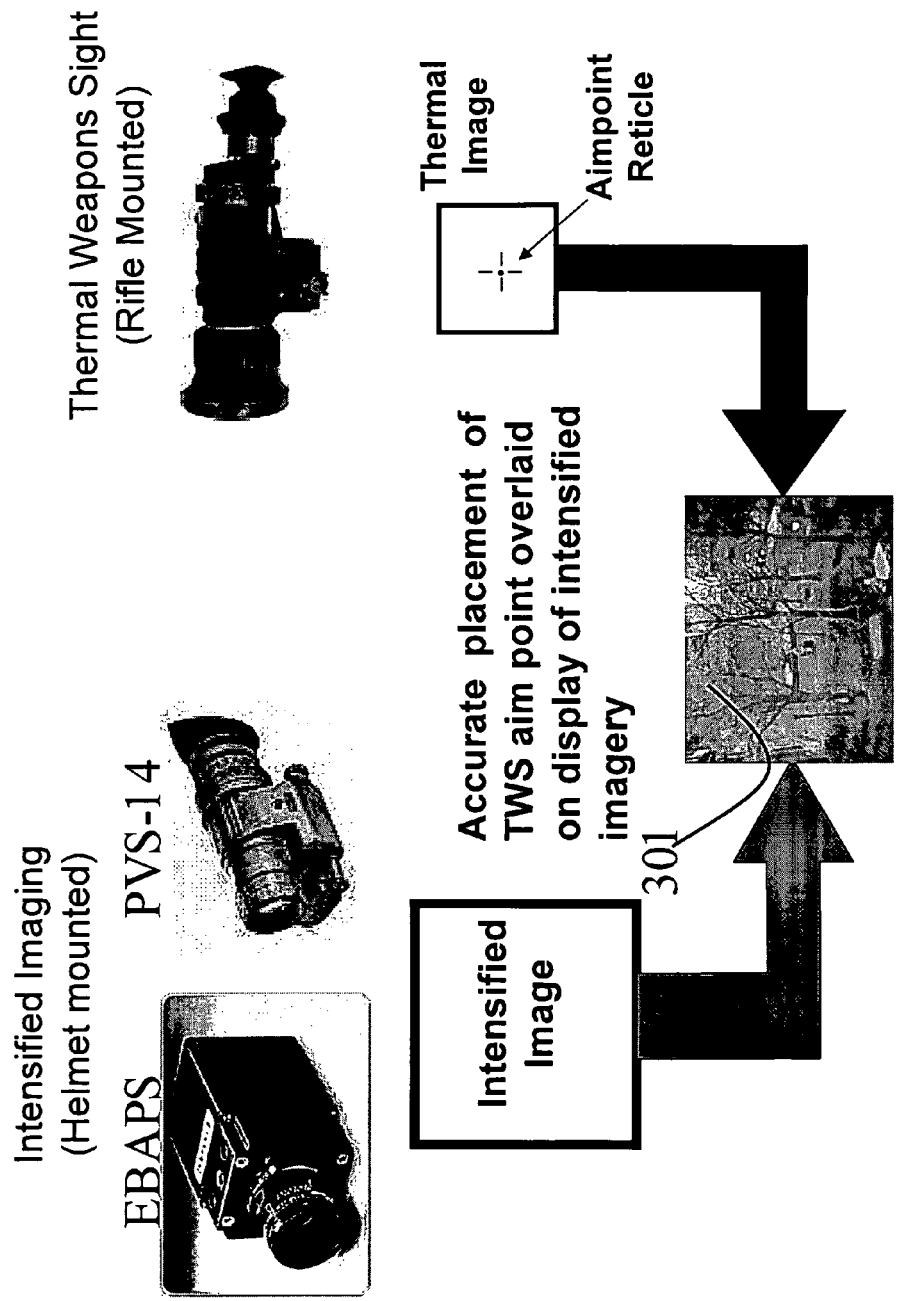

METHOD AND APPARATUS FOR DYNAMIC IMAGE REGISTRATION

CROSS REFERENCE TO RELATED APPLICATIONS

This application claims the benefit, under 35 U.S.C. 119 (e), of U.S. Provisional Application No. 60/924,264, filed May 7, 2007 the disclosure of which is hereby incorporated herein by reference in its entirety.

FIELD OF THE INVENTION

The invention relates to the image co-registration and fusion of two video imaging sensors that are in proximity of each other but not necessarily co-located or bore-sighted.

BACKGROUND OF THE INVENTION

The ability to successfully operate in darkness is a cornerstone of our military superiority. This capability is supported by a number of sensor technologies that outfit the modern dismounted soldier. Ranging from intensified near infrared (NIR), through shortwave infrared (SWIR), midwave infrared (MWIR) and onto the longwave thermal infrared (LWIR), these technologies allow for unprecedented sensory enhancement and extended operational conditions. One negative aspect of the proliferation of night-vision sensors is that even though many of these devices provide complementary capabilities, they do not build upon each other, and rather function separately. This result in redundant equipment, inability to simultaneously exploit more than one sensor modality and overly cumbersome operation, leading to decreased efficiency and higher vulnerability.

Simultaneous, complementary use of disparate sensor modalities would provide the dismounted soldier with increased situational awareness, and would allow for optimal use of available resources. The lower complexity of a unified sensor/display package would free the user to concentrate on the mission, not the tools, while at the same time having better quality sensory input upon which to operate. In addition to providing a combined output from multiple sensors, a unified system would obviate the awkward transition between devices that is currently necessary. With the proposed system, the user would be able to transition from one sensor output to another, or to a combination of multiple sensors with no need to switch or rearrange equipment. This would address a critical transition time during which the user is both blind and distracted, and therefore more vulnerable. A unified system would allow the user to have continuous, seamless visual input from multiple complementary sensors, greatly enhancing his capabilities.

There is an operational gap in being able to seamlessly transition/coordinate between a rifle mounted thermal weapon sight (TWS) and helmet mounted electro-optical (EO) cameras (e.g., intensified imaging). A soldier looking through a TWS temporarily interrupts his ability to perceive his surroundings beyond the narrow field-of-view of the TWS which can be fatal in a battlefield environment. In other instances, a soldier does not precisely know where his rifle is aimed in his visible field-of-view without peering into the TWS. In Low-light/No-Light conditions infantry have little to virtually no natural visual perception relying heavily upon intensified EO and thermal cameras provided to them. While on-the-move in a dynamic battlefield environment the soldier should be able to persistently perceive their surroundings through intensified EO while at the same time being able to direct their rifle aim point and accurately "shoot from the hip" with minimal distraction from their situational awareness. Furthermore this can be done passively without the use of active laser pointers or designators.

Current operations have determined that intensified night vision goggles alone do not provide the soldier with the capability to operate and survive in many environmental conditions and mission scenarios. As the enemy gets smarter in defeating night vision goggles and continues to gain this capability themselves US troops are finding their technological advantage deteriorating. Because of this, various DOD programs are emerging that emphasize the complementary use of EO and thermal infrared modalities and respective fusion.

A portion of the invention uses Inertial Measurement Units (IMU) consisting of a combination of accelerometers, gyroscopes and magnetometers. The accelerometers are used to determine the vertical direction, by measuring the acceleration of gravity. The magnetometers use the Earth's magnetic field to determine magnetic North, and thus left-to-right orientation. Finally, the gyroscopes are used to stabilize the instantaneous measurements from the other devices, and neutralize jitter from sensor noise. One problem with such a system is that the magnetometers are interfered upon by existing environmental magnetic fields, as well as the presence of large ferromagnetic objects. This is especially a problem when we consider that weapons themselves are made of steel, not to mention armored vehicles and other equipment normally found in the battlefield. The immediate implication is that any system based on magnetic readings will suffer interference from environmental noise that may render the entire system inaccurate. The novelty of the current invention is that it overcomes the inaccuracy limitations of IMUs by using both IMU information, and image feature registration through image processing to produce a much more reliable system.

SUMMARY OF THE INVENTION

One critical aspect of the proposed system design is the ability to register synchronized imagery between two video camera sensors. Specifically, we must be able to locate the (smaller) field-of-view camera sensor within the wider field-of-view camera. As this setup can be considered a generalized version of a stereo vision rig, the desired registration can be computed by calibrating it as such. We perform this calibration by measuring the intrinsic camera parameters for each sensor in the laboratory, and deducing relative camera orientations in real-time by using the Inertial Measurement Unit (IMU) devices mounted rigidly to each sensor-attached three dimensional frame. The computation of intrinsic camera parameters can be done in the laboratory by imaging a calibration pattern and applying any of a number of standard camera calibration algorithms [2]. This allows us to recover features such as the effective focal length of each camera system, and the location of their principal points on the respective focal plane arrays.

Recovery of the relative orientation of the two cameras is more complicated and requires a more complex calibration procedure. The main difficulty stems from the fact that the principal axis of each imaging device does not generally coincide with any canonical orientation axis of the IMU devices. This is a side-effect of the fact that we are limited in our options for mounting each device on their respective platforms, and thus we have no way of mechanically matching these axes. Furthermore, neither the camera's principal axis nor the orientation device's frame is perfectly aligned with either device's housing. The first necessary calibration step for each imaging platform is to determine the rotation from the orientation device reference frame x-axis to the corresponding camera's principal axis. Note that this step is separate for each imaging platform, and requires no interaction between them. Having recovered this rotation, we can derive each camera's principal axis from the corresponding orientation device output.

Once each camera has been calibrated with respect to its corresponding orientation sensor, there still remain some available degrees of freedom. The roll of each image source must be calibrated so that when the helmet mounted sensor is horizontal with respect to the ground plane, this corresponds to a horizontal reading from the corresponding orientation sensor, and a horizontally held weapon-sight yields a horizontal image on the display. Small residual corrections to adjust for bias in either orientation sensor can be added to complete the calibration process. Having fixed all these parameters, we are able to compute, in real-time, the relative orientation of both camera sensors by processing the input stream from the IMU orientation sensors.

The calibrated system uses the relative camera orientation information in order to register the narrow thermal field of view with the broad visible field of view. This is done under the assumption that the target is at a large distance from the user, so that the physical separation between the weapon sight and the helmet-mounted sensor is negligible with respect to the distance to the target. If the target is not very far away, there will be a distance-dependent misregistration between the two fields of regard. Given the laws of perspective imaging, there is no way to completely solve this problem, so we must work with the distant target assumption.

A prevalent behavior of IMU orientation sensors is that they drift over time so that image registration from IMU relative orientation calibration becomes more and more inaccurate and sometimes even unreliable. However, when there is significant overlap in the field-of-views of both cameras using additional information provided by matching image features between the two cameras reduces or virtually eliminates this drifting. The IMU and image feature registration work synergistically in that the IMUs provide at least coarse relative orientation information between the two cameras while image feature matching refines the registration more finely. Furthermore image registration reduces the effect of intrinsic sensor noise in the IMUs themselves. When there is significant overlap in field-of-view between both cameras, image feature matching alone (i.e., without IMU information) can bring the images into co-registration. There is certainly relevant application of this invention to the special case where the two cameras are in fact co-located, boresighted and have similar fields-of-view, such as for the U.S. Army ENVG-D and related programs, where automatic co-registration can be performed without the use of IMUs.

In terms of user interface, the system provides the user with an integrated view from his sensors, and the ability to switch between a few simple visualization modes. In a default setting for a rifle mounted thermal image weapon sight, the aim point reticle is overlayed on the view from the helmet-mounted visible intensified camera sensor, in its correctly registered location. For another setting the thermal weapon sight image is opaquely overlayed, and yet another setting the thermal weapon sight image is pixel fused where overlapping the helmet mounted camera. At no point during this process does the user need to bring the weapon up to the shoulder in order to engage the target, since the sight's reticle is clearly seen on the helmet mounted camera field of view. This constitutes a completely seamless transition from navigation to target detection and finally target engagement, all the while keeping the weapon slung and weight-relieved at the side.

BRIEF DESCRIPTION OF THE DRAWINGS

FIG. 3 is a digital overlay using a thermal weapons sight reticle overlayed on either an EBAPS intensified camera, or, a PVS-14 with Cast Fire focal plane array attachment.

DESCRIPTION OF THE INVENTION AND PREFERRED EMBODIMENTS

Figure 1:
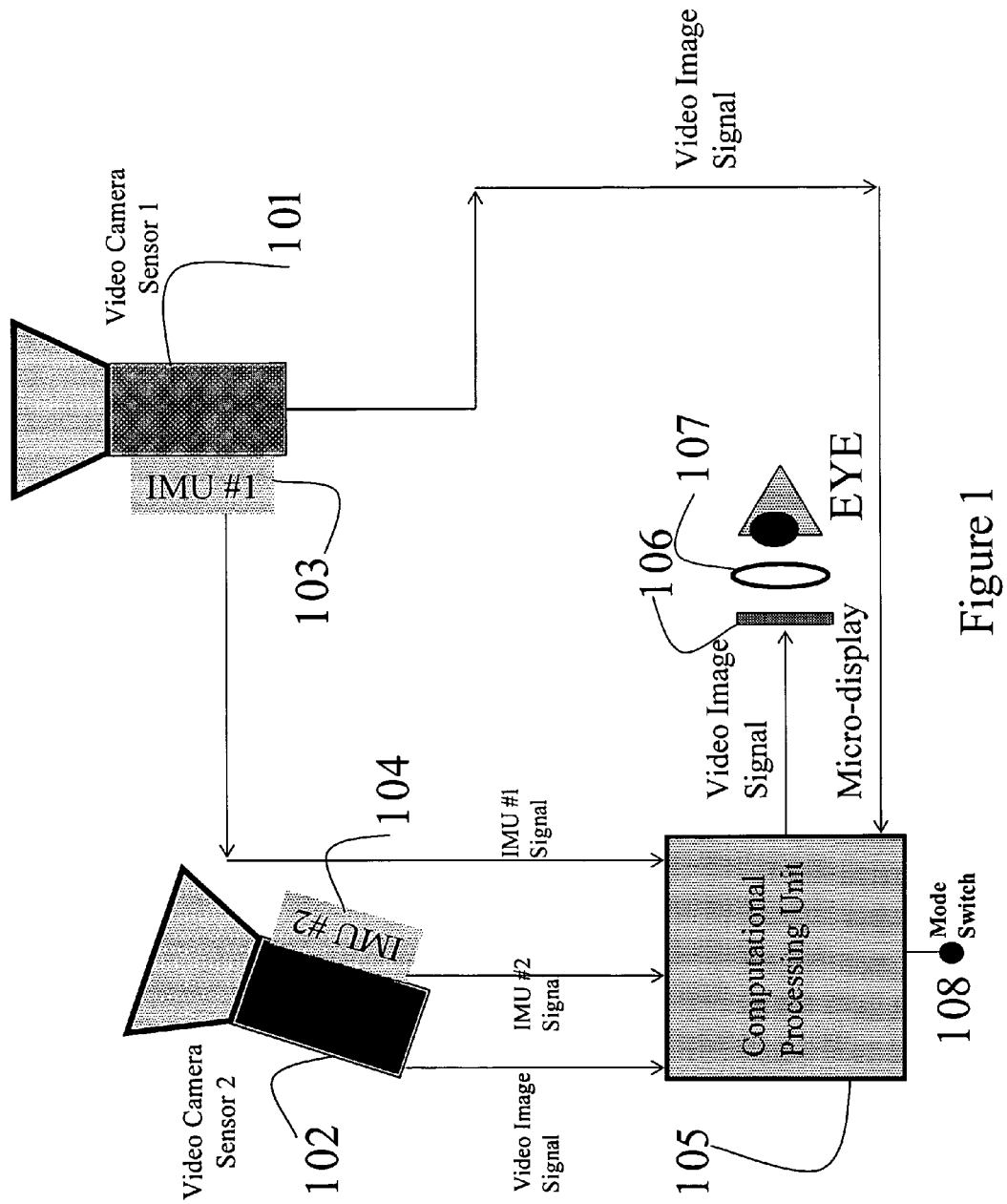
FIG. 1 is a diagram of a system using dynamic image registration to digitally overlay image information from two camera systems.
Figure 2A:
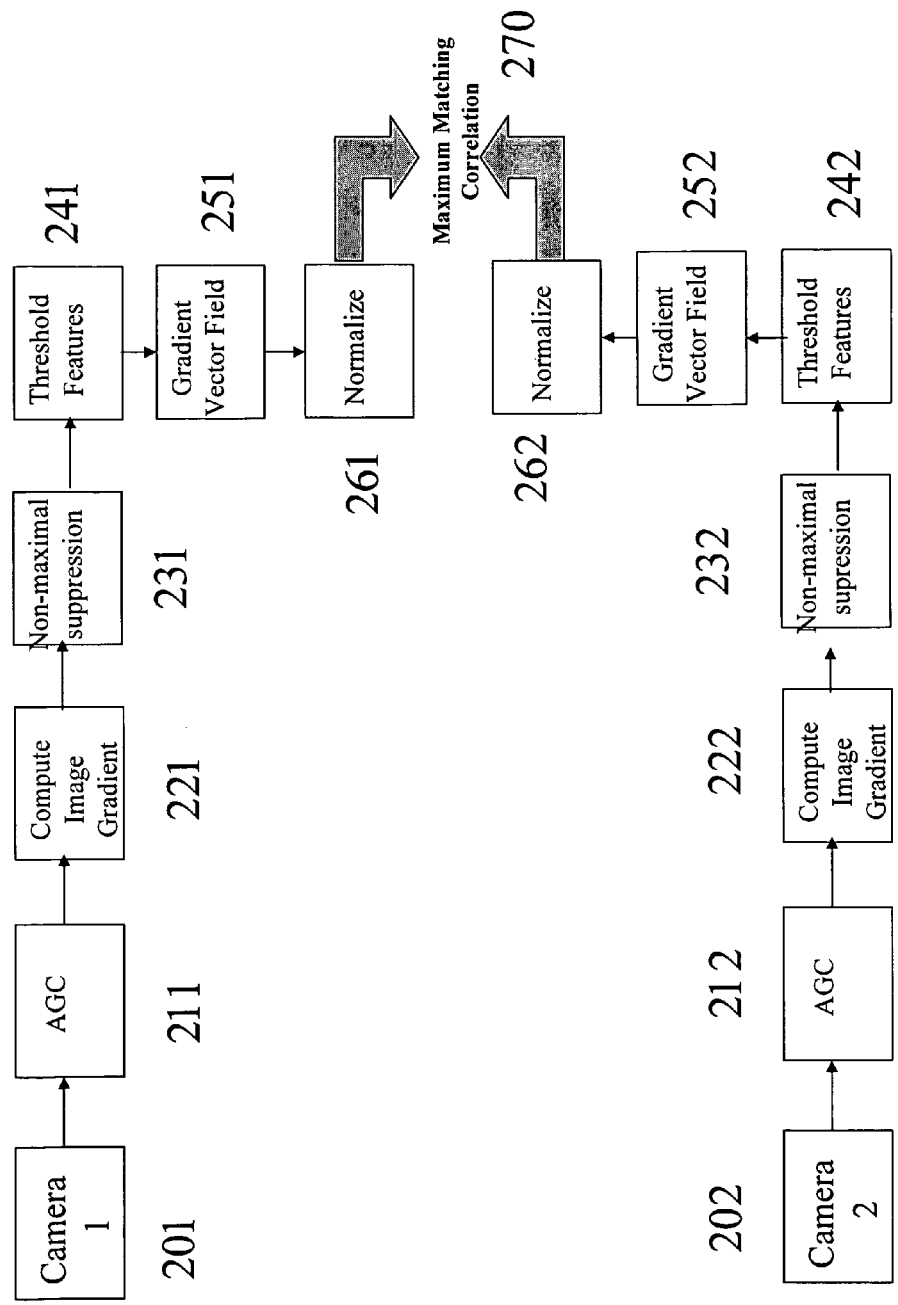
FIG. 2a is a block diagram of an image feature based image registration system and method.
Figure 2B:
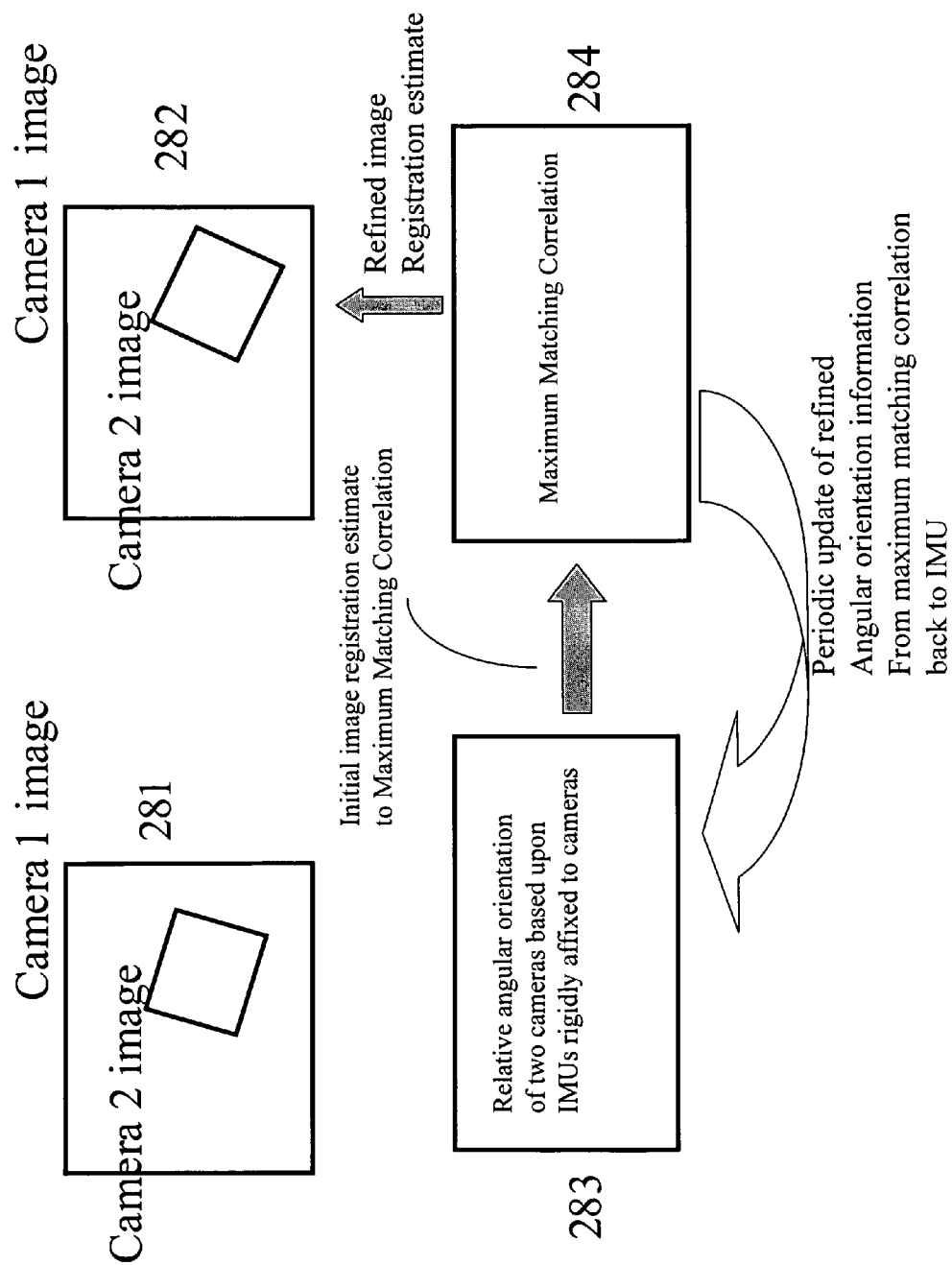
FIG. 2b shows a method of combining IMU information with information obtained from correlation of Image features to refine image registration.

FIG. 1 shows a diagram consisting of two cameras 101 and 102, any one of which could be Visible, Intensified, VisNIR, SWIR, MWIR or an LWIR camera within proximity of each other but not necessarily collocated or boresighted. Camera 101 has rigidly attached Inertial Measurement Unit (IMU) (e.g., made by the companies Microstrain or InterSense) 103 and camera 102 has rigidly attached IMU 104 used to measure the relative orientation of the two cameras. Signals from IMUs 103 and 104 are passed to computational processing unit 105 that are related to the yaw, pitch and roll angular orientation of each IMU. Measurement of the relative orientation of IMUs 103 and 104 (and therefore cameras 101 and 102) is derived by the computational unit 105. This computational processing unit could be a general purpose PC, a Single Board Computer, an FPGA customized board or an ASIC, but is not limited to be one of these. In many cases the relative orientation measurement from IMUs 103 and 104 is not sufficiently accurate, particularly due to drifting over time and intrinsic noise, to keep cameras 101 and 102 accurately co-registered. Image processing methods used to register/correlate features between the images from cameras 101 and 102 is shown in FIG. 2a, used in conjunction with IMU relative angular orientation measurements to keep the images accurately co-registered (as shown in FIG. 2b). Video images from cameras 101 and 102 are passed onto computational unit 105 where this processing is performed. The digitally co-registered result is displayed on a microdisplay (e.g., Kopin or eMagine) 106 viewed through an eyepiece 107. Although a microdisplay is preferred, in general display 106 can be any display that receives a video image signal including but not limited to a television or a computer monitor. A mode switch 108 can be used to switch between digital display modes including but not limited to aim point reticle only, opaque co-registered overlay of Camera 2 overlapping area on Camera 1, alpha transparency blend overlay of Camera 2 overlapping area on Camera 1, pixel fusion across overlay of Camera 2 overlapping area on Camera 1, etc. . . .

FIG. 2a teaches how image registration is performed through image processing techniques. In FIG. 2a the first image processing step applied to video images outputted from cameras 201 and 202 (corresponding to cameras 101 and 102 in FIG. 1) is Automatic Gain Control (AGC) 211 and 212. AGC image processing is used to enhance local image contrast using techniques such as histogram specification or pixel gray-level transformation functions described in [3]. Subsequent to AGC image gradients are extracted from the respective camera sensor images 221 and 222 which quantify local edge strength information at different portions. A number of image gradient operations are described in [3]. After this non-maximum suppression [4] 231 and 232 is applied which thins the edge map to where only dominant edge values exist. Further thresholding on edge strength values are applied in 241 and 242 to segment where the strongest edges lay in the respective images. A gradient vector field is generated in each image 251 and 252 that quantifies the orientation direction and strength at the pixels where the strongest edges are in the respective images. This gradient vector field is then normalized 261 and 262 so that each strong edge strength has unit magnitude. Subsequently the normalized gradient vector fields are match correlated for similarity between the two images, the maximum match correlation 270 occurring at the relative spatial position at which the images are accurately registered together.

As shown in FIG. 2b relative angular orientation information of the two cameras 283 provides an initial estimate of the image registration between the two camera images 281. This initial estimate is provided to the maximum match correlation 284 (corresponding to 270 in FIG. 2a) which then refines the accuracy of the image registration 282. As the IMUs have natural drift and noise characteristics refined information from the maximum match correlation is periodically fed back to the IMUs which in turn contributes to an initial estimate back into the maximum match correlation, and so on. This is particularly important for dynamic situations where, for example, Camera 2 as a rifle mounted TWS is persistently in relative motion to Camera 1 mounted on a helmet.

FIG. 3 shows an example where Camera 1 is either an EBAPS or PVS-14 (with attached clip-on Cast fire focal plane) and Camera 2 is a thermal weapon sight (TWS). In this case the display on an HMD is the TWS reticle overlayed on the image produced by either the EBAPS or the PVS-14 with Cast fire attachment.

Figure 4:
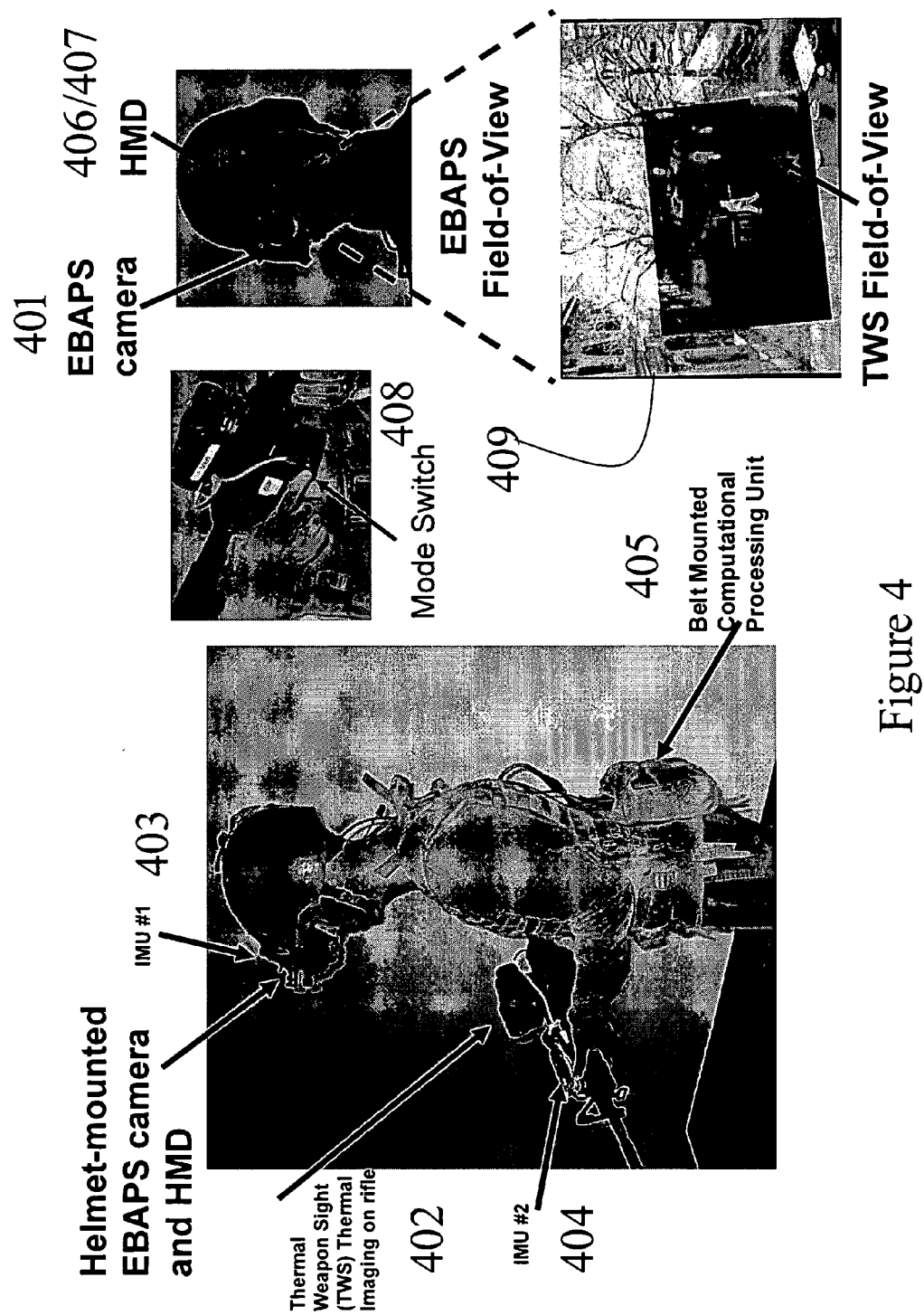
FIG. 4 is an image of a preferred embodiment using a rifle mounted TWS and a helmet mounted EBAPS intensified camera.

FIG. 4 shows one preferred embodiment of an actual implemented system with items 40X corresponding to items 10X from FIG. 1, using an intensified digital camera for Camera 1 and a rifle mounted TWS for Camera 2. Item 409 shows a digital partial transparency overlay of the TWS field-of-view (in Red) on top of the intensified field-of-view.

Figure 5:
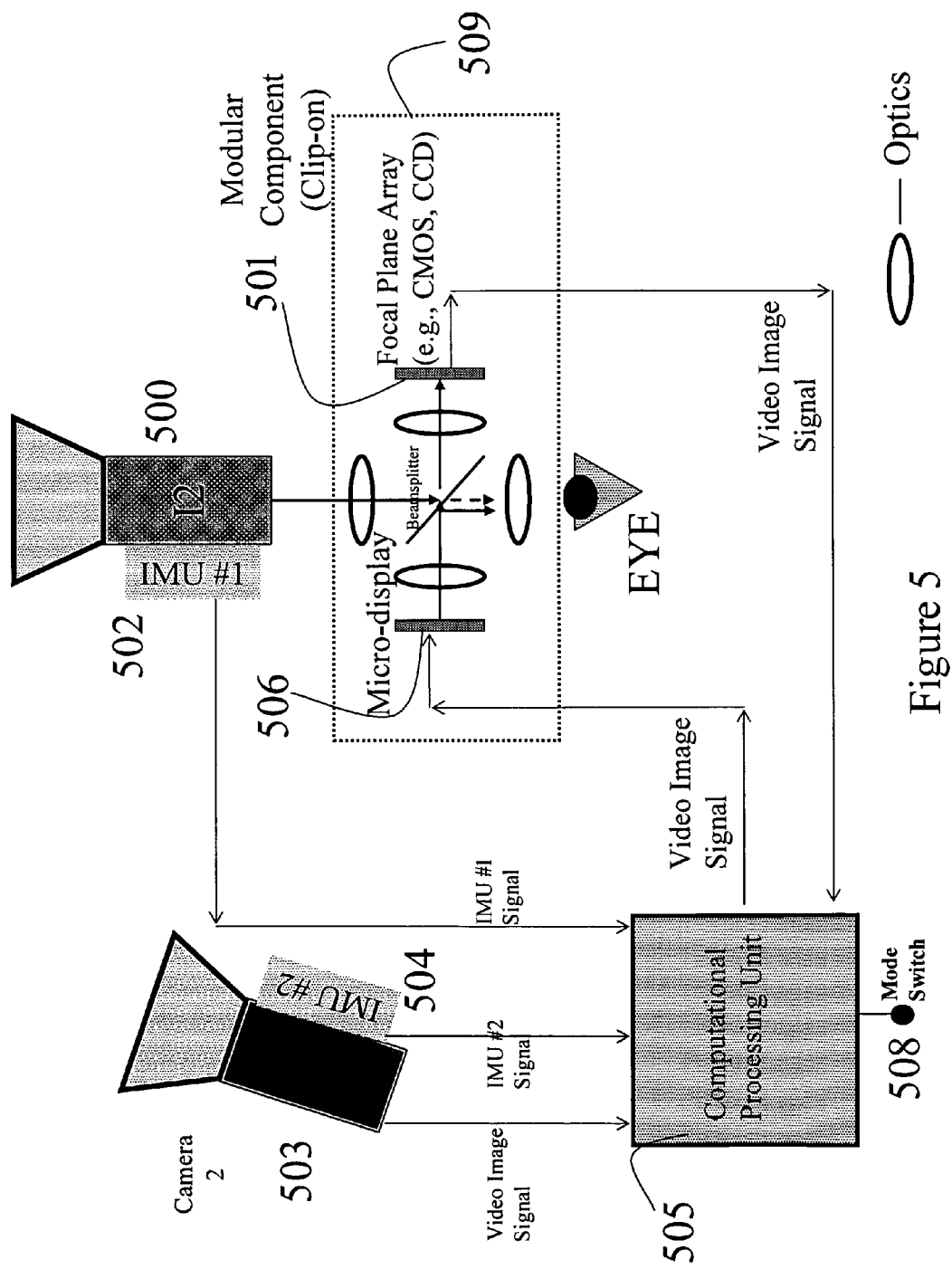
FIG. 5 is a diagram of system using dynamic image registration to optically overlay image information from one camera with a direct view device.

FIG. 5 shows an optical overlay version of the system shown in FIG. 1. In this case the focal plane array 501 in FIG. 5 serves the purpose of imaging the output of the direct view intensifier tube system (e.g., off the intensifier phosphor) and passing this as a video signal to the computational unit 505 for registration/correlation image processing along with the video camera sensor 503 image. In conjunction with the IMU signals from 502 and 504, the computational unit 505 uses this information to produce a video image signal displayed on the micro-display 506 which is optically combined/overlayed with the direct view intensified system 500. The accuracy of placement of the displayed image on the micro-display when optically combined/overlayed on the intensified field-of-view, is critical. This placement is computed by the computational unit 505 using information from IMUs, focal plane array image and thermal sensor image. A modular optical attachment 509 could be made to be a clip-on attachment to the direct view device 500.

Figure 6:
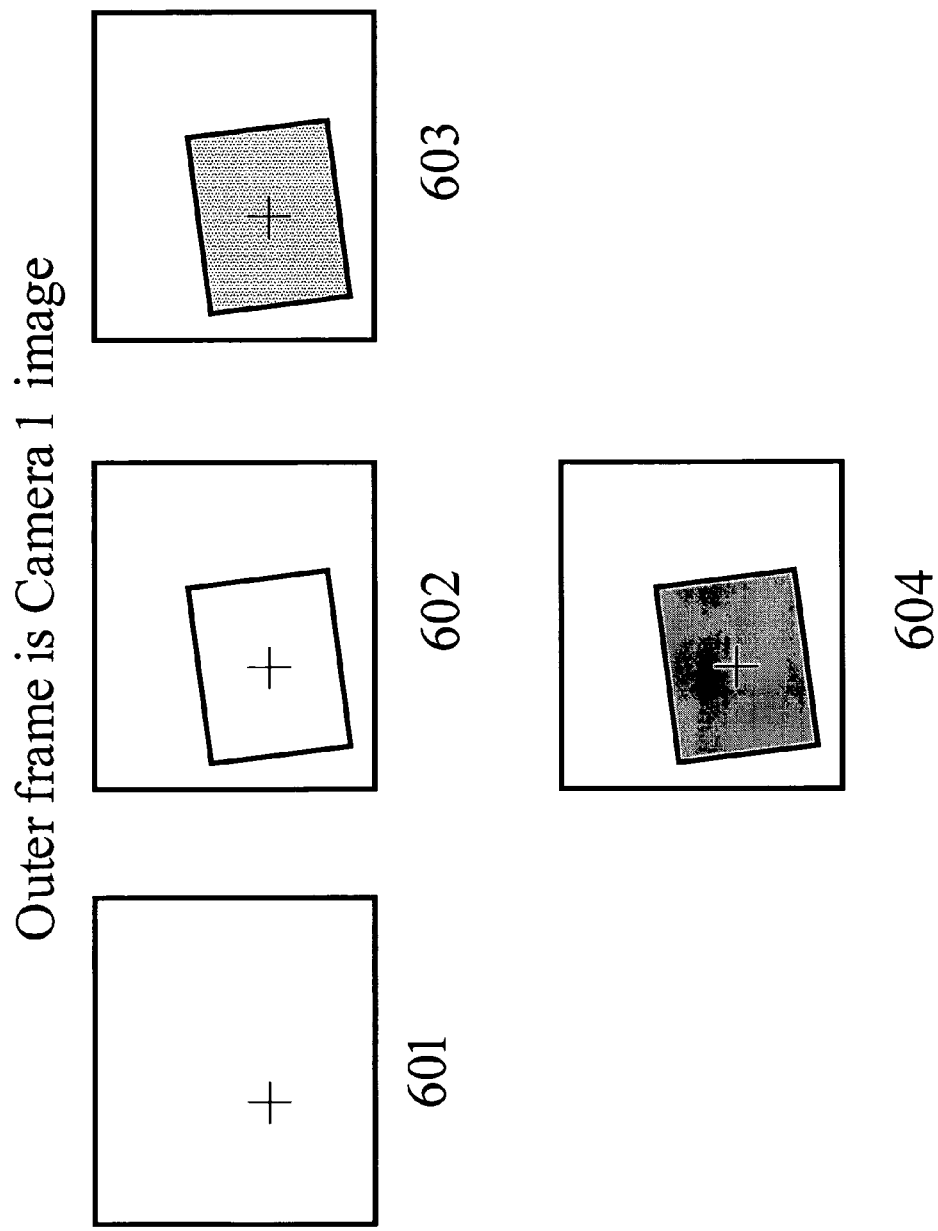
FIG. 6 is a diagram showing different display modes for image registration.

FIG. 6 shows different possible modes of displaying image registration information. In 601 only the center point reticle from the image of Camera 2 is overlayed. In 602 the wireframe outline of the image from Camera 2 is added. In 603 a partial transparent overlay of the image from Camera 2 is overlayed whereas in 604 an opaque overlay of Camera 2 image is overlayed. These modes can be switched between using the mode switch shown as 108, 408, and 508. In general many forms of pixel fusion can be performed within the overlap area of Camera 2 with Camera 1 as shown in the materials provided for the provisional application.

REFERENCES

[1] Jorge Lobo, http://www.deec.uc.pt/~jlobo/InerVis_WebIndex/InerVis_Toolbox.html
[2] R. Y. Tsai, A Versatile Camera Calibration Technique for High-Accuracy 3D Machine Vision Metrology Using Off-the-shelf cameras, IEEE Journal of Robotics and Automation, 1987
[3] R. C. Gonzalez and R. E. Woods, Digital Image Processing, Addison-Wesley Publishing Company 1993
[4] J. Canny, A Computational Approach to Edge Detection, *PAMI*(8), No. 6, November 1986, pp. 679-698.

The invention claimed is:

1. An apparatus for co-registering video images generated by multiple camera sensors comprising:
   a first camera sensor which forms a first video image and generates a first corresponding video image output signal, said first camera sensor having a principal axis defining a viewing direction of said first camera sensor;
   a second camera sensor which forms a second video image and generates a second corresponding video image output signal, said second camera sensor having a principal axis defining a viewing direction of said second camera sensor; and,
   a computational processing unit for receiving said first and second video image output signals, determining a relative angular orientation of said first camera principal axis relative to said second camera principal axis, and employing said relative angular orientation of said first camera principal axis relative to said second camera principal axis to generate a combined video image output signal in which first information from said first video image is spatially co-registered with second information from said second video image.

2. The apparatus of claim 1, wherein said first and second camera sensors each has its principal axis oriented such that a field of view of said first camera sensor overlaps a field of view of said second camera sensor and said computational processing unit uses match correlation image processing between said first video image and said second video image to determine the angular orientation of said first camera principal axis relative to said second camera principal axis.

3. The apparatus of claim 1, wherein said first and second camera sensors each includes a tracking device for tracking its principal axis and said computational processing unit uses signals generated by said tracking devices to determine the angular orientation of said first camera principal axis relative to said second camera principal axis.

4. The apparatus of claim 3, wherein each said tracking device is an Inertial Measurement Unit (IMU).

5. The apparatus of claim 3, wherein said first and second camera sensors each has its principal axis oriented such that a field of view of said first camera sensor overlaps a field of view of said second camera sensor and said computational processing unit further uses a match correlation image process between said first video image and said second video image to assist in determining the angular orientation of said first camera principal axis relative to said second camera principal axis.

6. The apparatus of claim 5, wherein said match correlation image process is carried out by generating a gradient vector field for each of said first and second video images that quantifies characteristics in each of said video images at positions where one or more edges are located; match correlating said gradient vector fields for similarity between said first and second video images; and identifying a maximum match correlation, said maximum match correlation occurring at a relative spatial position at which the images are accurately co-registered.

7. The apparatus of claim 6, wherein said signals generated by said tracking devices provide an initial estimate of the image registration between said first and second video images and said initial estimate is employed by said match correlation image process which refines the accuracy of the image registration.

8. The apparatus of claim 7, wherein said computational processing unit is further configured such that maximum match correlation information generated by said matching correlation process is periodically fed back to said tracking devices to compensate for natural drift and noise characteristics of said tracking devices.

9. The apparatus of claim 1, further comprising a video display for displaying said combined video image output signal generated by said computational processing unit.

10. The apparatus of claim 9, wherein said video display is head mounted.

11. The apparatus of claim 10, wherein said first camera sensor is head mounted.

12. The apparatus of claim 11, wherein said second camera sensor is weapon mounted.

13. The apparatus of claim 9, wherein said video display is a microdisplay that optically overlays with a direct view system.

14. The apparatus of claim 13, wherein said first camera sensor images through said direct view system.

15. The apparatus of claim 14, wherein said video display and said first camera sensor are head mounted.

16. The apparatus of claim 15, wherein said second camera sensor is weapon mounted.

17. The apparatus of claim 16, wherein said second camera sensor is a weapon sight and said second information from said second video image that is spatially co-registered with said first information from said first video image to form said combined video image output signal is selected from the group comprising: a reticle for said sight; an outline of said second image; a partially transparent overlay of said second image; and, an opaque overlay of said second image.

18. The apparatus of claim 17, further comprising means for selecting which of said second information from said second video image is spatially co-registered with said second information from said first video image to form said combined video image output signal.

19. A method for co-registering video images generated by multiple camera sensors comprising the steps of:
forming a first video image with a first camera sensor and generating a first corresponding video image output signal, said first camera sensor having a principal axis defining a viewing direction of said first camera sensor;
forming a second video image with a second camera sensor and generating a second corresponding video image output signal, said second camera sensor having a principal axis defining a viewing direction of said second camera sensor;
determining a relative angular orientation of said first camera principal axis relative to said second camera principal axis; and
employing said first and second video image output signals and said relative angular orientation of said first camera principal axis relative to said second camera principal axis to generate a combined video image output signal in which first information from said first video image is spatially co-registered with second information from said second video image.

20. The method of claim 19, wherein said first and second camera sensors each has its principal axis oriented such that a field of view of said first camera sensor overlaps a field of view of said second camera sensor and match correlation image processing between said first video image and said second video image is employed to determine the angular orientation of said first camera principal axis relative to said second camera principal axis.

21. The method of claim 19, wherein said first and second camera sensors each includes a tracking device for tracking its principal axis and signals generated by said tracking devices are employed to determine the angular orientation of said first camera principal axis relative to said second camera principal axis.

22. The method of claim 21, wherein said first and second camera sensors each has its principal axis oriented such that a field of view of said first camera sensor overlaps a field of view of said second camera sensor and a match correlation image process between said first video image and said second video image is further employed to assist in determining the angular orientation of said first camera principal axis relative to said second camera principal axis.

23. The method of claim 22, wherein said match correlation image process is carried out by generating a gradient vector field for each of said first and second video images that quantifies characteristics in each of said video images at positions where one or more edges are located; match correlating said gradient vector fields for similarity between said first and second video images; and determining a relative spatial position at which said first and second images are accurately co-registered by identifying where a maximum match correlation occurs.

24. The method of claim 23, wherein said signals generated by said tracking devices provide an initial estimate of the image registration between said first and second video images and said initial estimate is employed by said match correlation image process which refines the accuracy of the image registration.

25. The method of claim 24, wherein maximum match correlation information generated by said matching correlation process is periodically fed back to said tracking devices to compensate for natural drift and noise characteristics of said tracking devices.

26. The method of claim 19, further comprising the step of displaying said combined video image output signal on a video display.

27. The method of claim 26, wherein said first camera sensor images through a direct view system that optically overlays with said video display.

28. The method of claim 19, wherein said second camera sensor is a weapon sight and said second information from said second video image that is spatially co-registered with said first information from said first video image to form said combined video image output signal is selected from the group comprising: a reticle for said sight; an outline of said second image; a partially transparent overlay of said second image; and, an opaque overlay of said second image.

29. The method of claim 19, wherein the principal axis of said first camera sensor and the principal axis of said second camera sensor are moving relative to one another at least during a portion of said generating of said first and second video output signals.

30. The apparatus of claim 1, wherein the principal axis of said first camera sensor and the principal axis of said second camera sensor are movable relative to one another during said generating of said first and second video output signals.

31. An apparatus for co-registering video images generated by multiple camera sensors comprising:
 a first camera sensor which forms a first video image and generates a first corresponding video image output signal, said first camera sensor having a principal axis defining a viewing direction of said first camera sensor;
 a second camera sensor which forms a second video image and generates a second corresponding video image output signal, said second camera sensor having a principal axis defining a viewing direction of said second camera sensor;
 wherein said first and second camera sensors each has its principal axis oriented such that a field of view of said first camera sensor overlaps a field of view of said second camera sensor; and
 a computational processing unit for receiving said first and second video image output signals, and using match correlation image processing between said first video image and said second video image to generate a combined video image output signal in which first information from said first video image is spatially co-registered with second information from said second video image.

32. The apparatus of claim 31, wherein said match correlation image process is carried out by generating a gradient vector field for each of said first and second video images that quantifies characteristics in each of said video images at positions where one or more edges are located; match correlating said gradient vector fields for similarity between said first and second video images; and identifying a maximum match correlation, said maximum match correlation occurring at a relative spatial position at which the images are accurately co-registered.

33. The apparatus of claim 31, wherein said first and second camera sensors each includes a tracking device for tracking its principal axis and wherein said signals generated by said tracking devices provide an initial estimate of the image registration between said first and second video images and said initial estimate is employed by said match correlation image process which refines the accuracy of the image registration.

34. The apparatus of claim 33, wherein said computational processing unit is further configured such that maximum match correlation information generated by said matching correlation process is periodically fed back to said tracking devices to compensate for natural drift and noise characteristics of said tracking devices.

35. The apparatus of claim 33, wherein said first camera sensor is head mounted.

36. The apparatus of claim 35, wherein said second camera sensor is weapon mounted.

37. The apparatus of claim 36, wherein the principal axis of said first camera sensor and the principal axis of said second camera sensor are movable relative to one another during said generating of said first and second video output signals.

* * * * *